(12) United States Patent
Wang et al.

(10) Patent No.: US 11,479,170 B2
(45) Date of Patent: Oct. 25, 2022

(54) WARNING STRUCTURE AND BRACKET

(71) Applicant: Fulian Precision Electronics (Tianjin) Co., LTD., Tianjin (CN)

(72) Inventors: Pao-Ching Wang, New Taipei (TW); Ke-Cheng Lin, New Taipei (TW); Wen-Chen Wang, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 350 days.

(21) Appl. No.: 16/829,201

(22) Filed: Mar. 25, 2020

(65) Prior Publication Data

US 2021/0261051 A1    Aug. 26, 2021

(30) Foreign Application Priority Data

Feb. 21, 2020   (CN) .......................... 202010107563.6

(51) Int. Cl.
| | | |
|---|---|---|
| *B60Q 7/00* | (2006.01) | |
| *E01F 9/654* | (2016.01) | |
| *E01F 9/646* | (2016.01) | |
| *E01F 9/662* | (2016.01) | |
| *E01F 9/692* | (2016.01) | |
| *F16M 11/22* | (2006.01) | |
| *F16M 11/42* | (2006.01) | |

(Continued)

(52) U.S. Cl.
CPC .............. *B60Q 7/005* (2013.01); *E01F 9/646* (2016.02); *E01F 9/654* (2016.02); *E01F 9/662* (2016.02); *E01F 9/692* (2016.02); *F16M 11/22* (2013.01); *F16M 11/42* (2013.01); *G08G 1/09* (2013.01); *F16M 2200/08* (2013.01); *G09F 13/16* (2013.01)

(58) Field of Classification Search
CPC . E01F 9/646; E01F 9/654; E01F 9/662; E01F 9/692; B60Q 7/005; F16M 11/22; F16M 11/42; G08G 1/09
See application file for complete search history.

(56) References Cited

U.S. PATENT DOCUMENTS

| | | | | |
|---|---|---|---|---|
| 2,333,273 A | * | 11/1943 | Scanlon ................... | E01F 9/688 D10/113.2 |
| 4,465,262 A | * | 8/1984 | Itri ......................... | E04H 17/166 49/55 |

(Continued)

FOREIGN PATENT DOCUMENTS

| | | |
|---|---|---|
| CN | 206189301 U | 5/2017 |
| CN | 107009957 A | 8/2017 |

(Continued)

*Primary Examiner* — Abigail A Risic
(74) *Attorney, Agent, or Firm* — ScienBiziP, P.C.

(57) ABSTRACT

A warning structure includes a bracket and a warning member mounted on the bracket. The bracket includes a main body, rollers rotationally mounted to the main body, and a stopping assembly including a support member, a mounting member, and a resilient member. The support member is coupled to the main body. The mounting member is movably mounted to the support member. The rollers are mounted to the mounting member and the main body. The resilient member elastically resists the support member and the mounting member to bias the mounting member. When the support member is subjected to a downward force, the support member abuts against a ground to keep the bracket stationary.

10 Claims, 4 Drawing Sheets

(51) Int. Cl.
*G08G 1/09* (2006.01)
*G09F 13/16* (2006.01)

(56) References Cited

U.S. PATENT DOCUMENTS

| | | | | |
|---|---|---|---|---|
| 5,529,429 | A * | 6/1996 | Pelegrin | E01F 9/646 |
| | | | | 404/9 |
| 5,549,410 | A * | 8/1996 | Beryozkin | E01F 13/12 |
| | | | | 404/6 |
| 6,832,870 | B1 * | 12/2004 | Krivoy | E01F 15/006 |
| | | | | 414/458 |
| 7,140,581 | B1 * | 11/2006 | White | E01F 9/692 |
| | | | | 40/607.1 |
| 8,164,483 | B1 * | 4/2012 | Phillips | E01F 9/681 |
| | | | | 116/63 P |
| 10,370,807 | B2 * | 8/2019 | Stevens | E01F 13/12 |
| 10,850,663 | B1 * | 12/2020 | Wang | G09F 13/16 |
| 2006/0232441 | A1 * | 10/2006 | Hill | E01F 9/662 |
| | | | | 40/586 |
| 2010/0290833 | A1 * | 11/2010 | Whitford | F41H 5/14 |
| | | | | 404/6 |
| 2014/0182109 | A1 * | 7/2014 | Williams | E01F 9/692 |
| | | | | 29/428 |
| 2018/0226000 | A1 * | 8/2018 | Kitzerow | G09F 7/18 |
| 2018/0361926 | A1 * | 12/2018 | Tseng | G09F 21/00 |
| 2018/0363255 | A1 * | 12/2018 | Tseng | G09F 19/22 |
| 2019/0024332 | A1 * | 1/2019 | Huang | E01F 9/688 |
| 2019/0360164 | A1 * | 11/2019 | Lee | B60Q 7/00 |
| 2021/0174712 | A1 * | 6/2021 | Chien | G09F 13/20 |
| 2021/0197718 | A1 * | 7/2021 | Lin | B60Q 7/005 |
| 2021/0262180 | A1 * | 8/2021 | Lin | E01F 9/608 |

FOREIGN PATENT DOCUMENTS

| | | |
|---|---|---|
| CN | 207852255 U | 9/2018 |
| CN | 109080532 A | 12/2018 |
| JP | S55106211 U | 7/1980 |
| JP | H09-327344 A | 12/1997 |
| JP | H11-506971 A | 6/1999 |
| TW | I642829 B | 12/2018 |

* cited by examiner

WARNING STRUCTURE AND BRACKET

FIELD

The subject matter herein generally relates to warning structures, and more particularly to a warning structure for use on the road.

BACKGROUND

Many warning structures come equipped with rollers. Generally, a warning structure, such as a warning triangle, needs to be placed on the ground during an emergency stop. However, a wind may cause the warning structure to move out of position.

BRIEF DESCRIPTION OF THE DRAWINGS

Implementations of the present disclosure will now be described, by way of embodiments, with reference to the attached figures.

DETAILED DESCRIPTION

Figure 1:
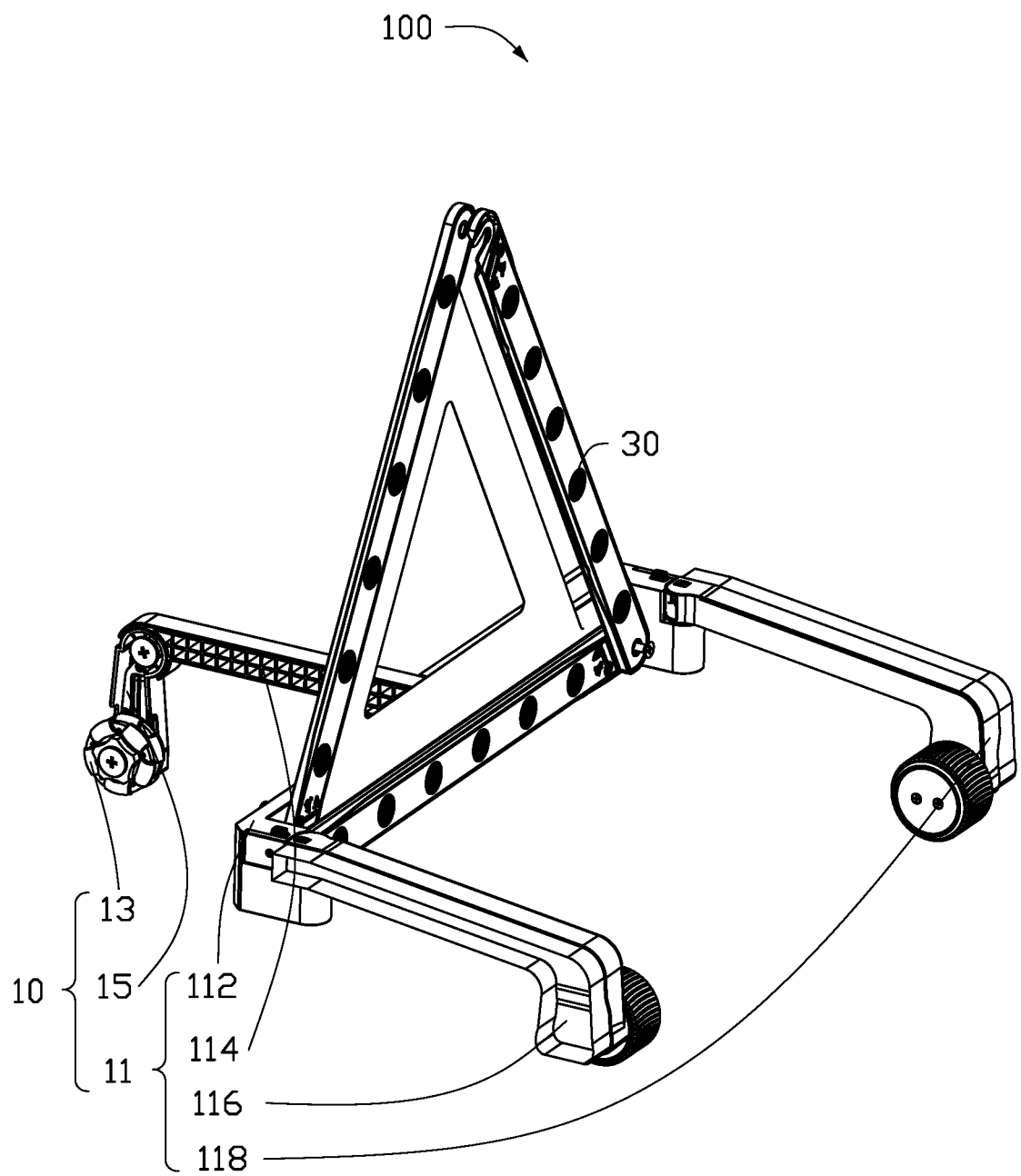
FIG. 1 is an assembled, isometric view of an embodiment of a warning structure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of a warning structure 100 including a bracket 10 and a warning member 30 provided on the bracket 10.

The bracket 10 includes a main body 11, a plurality of rollers 13, and at least one stopping assembly 15. The main body 11 is connected to the warning member 30. The at least one stopping assembly 15 is connected to the main body 11 and configured to prevent the bracket 10 from being moved by an external force, such as wind.

Figure 2:
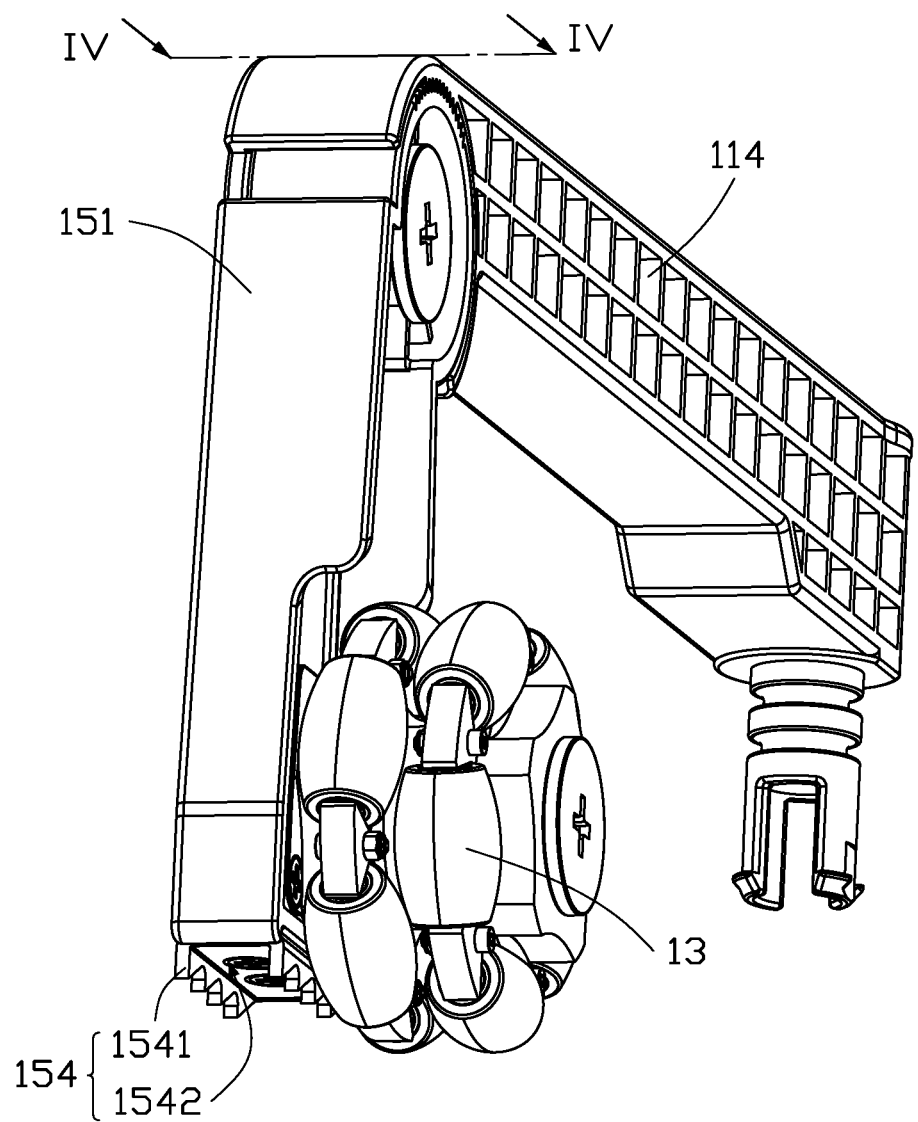
FIG. 2 is an isometric view of a first extending member and a stopping assembly of the warning structure.
Figure 3:
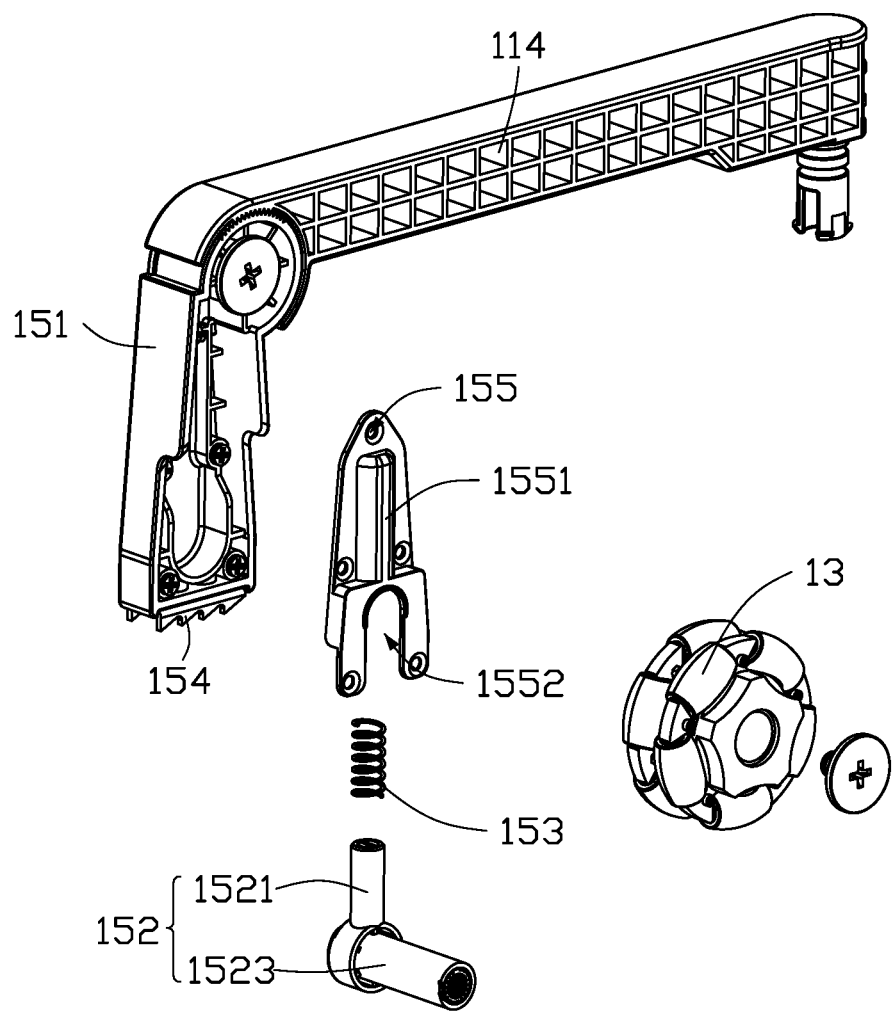
FIG. 3 is an exploded, isometric view of the first extending member and the stopping assembly.
Figure 4:
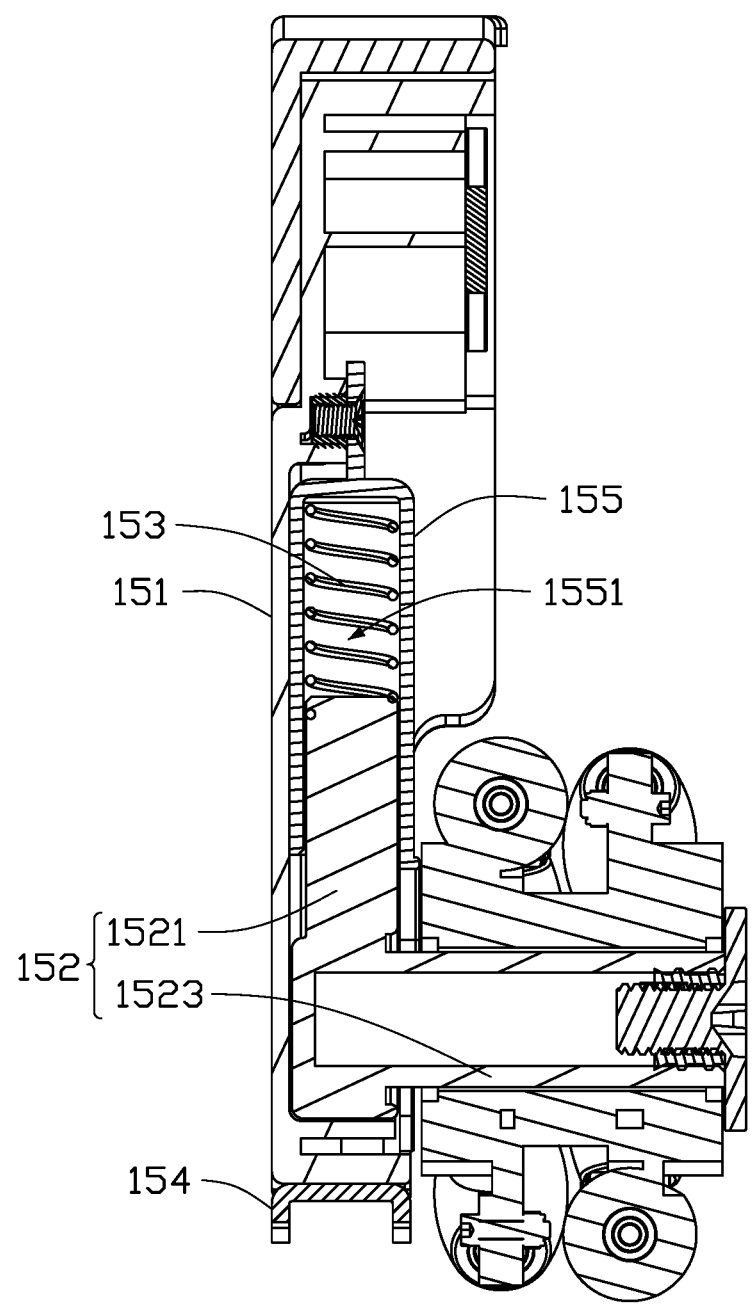
FIG. 4 is a cross-sectional view taken along line IV-IV in FIG. 2.

Referring to FIGS. 2-4, the stopping assembly 15 includes a support member 151, a mounting member 152, and a resilient member 153. The support member 151 is connected to the main body 11. The mounting member 152 is movably mounted on the support member 151. The mounting member 152 is connected to a corresponding one of the rollers 13. The resilient member 153 elastically resists the support member 151 and the mounting member 152 to bias the mounting member 152 toward a ground. When the support member 151 is subjected to a downward force, a bottom of the support member 151 abuts against the ground to keep the bracket 10 stationary.

In one embodiment, the stopping assembly 15 further includes a stopping member 154. The stopping member 154 is located on a bottom end of the support member 151. The stopping member 154 is provided with a plurality of protruding portions 1541. The protruding portions 1541 are configured to be inserted into the ground. Specifically, the stopping member 154 includes a fixing portion 1542, and the plurality of protruding portions 1541 is located on opposite sides of the fixing portion 1542.

In one embodiment, the stopping assembly 15 further includes a sleeve 155. The sleeve 155 is fixed in the support member 151. The sleeve 155 defines a receiving cavity 1551. The resilient member 153 is received in the receiving cavity 1551. The mounting member 152 includes a first mounting portion 1521 and a second mounting portion 1523, the second mounting portion 1523 is substantially perpendicular to the first mounting portion 1521. The first mounting portion 1521 is movably disposed in the receiving cavity 1551 and contacts the resilient member 153. The corresponding one of the rollers 13 is rotationally sleeved on the second mounting portion 1523.

The sleeve 155 further defines a guiding groove 1552, and the second mounting portion 1523 is slidably passed through the guiding groove 1552.

The main body 11 includes a connecting member 112, a first extending member 114, a second extending member 116, and a third extending member 118. The connecting member 112 is connected to the warning member 30. The first extending member 114, the second extending member 116, and the third extending member 118 are connected to the connecting member 112. The first extending member 114 is connected to a substantially middle portion of the connecting member 112. The second extending member 116 and the third extending member 118 are respectively connected to two ends of the connecting member 112. The second extending member 116 and the third extending member 118 are located on one side of the connecting member 112, and the first extending member 114 is located on another side of the connecting member 112.

A distal end of the second extending member 116 and a distal end of the third extending member 118 are connected to a corresponding roller 13. A distal end of the first extending member 114 is connected to the stopping assembly 15.

In one embodiment, the warning member 30 is a triangle. It can be understood that in other embodiments, the warning member 30 may be other shapes.

In use, after the warning structure 100 is set in position, when an external force such as a wind blows, the external force may tilt the warning member 30, and a portion of the external force is converted into a downward force. Under the action of the downward force, the first extending member 114 drives the support member 151 to move downward to compress the resilient member 153, and the stopping member 154 inserts into the ground. When the external force vanishes, the resilient member 153 drives the support member 151 to restore a position of the support member 151.

It can be understood that in other embodiments, the number of the stopping assemblies 15 can be set as many as required and the stopping assemblies 15 may be disposed on other parts such as the second extending member 116 and the third extending member 118.

As described above, the support member 151 of the bracket 10 prevents the warning structure 100 from being moved by an external force, thereby improving a stability of the warning structure 100.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A bracket comprising:
a main body;
a plurality of rollers rotationally mounted to the main body; and
a stopping assembly comprising a support member, a mounting member, and a resilient member; wherein:
the support member is coupled to the main body;
the mounting member is movably mounted to the support member;
the plurality of rollers is mounted to the mounting member and the main body;
the resilient member elastically resists the support member and the mounting member to bias the mounting member; and
when the support member is subjected to a downward force, the support member abuts against a ground to keep the bracket stationary;
the stopping assembly further comprises a sleeve;
the sleeve is fixed in the support member;
the sleeve defines a receiving cavity;
the mounting member comprises a first mounting portion and a second mounting portion;
the first mounting portion is movably disposed in the receiving cavity;
a corresponding one of the plurality of rollers is rotationally sleeved on the second mounting portion; and
the resilient member is mounted in the receiving cavity and contacts the first mounting portion.

2. The bracket of claim 1, wherein:
the stopping assembly further comprises a stopping member mounted on a bottom end of the support member;
the stopping member comprises at least one protruding portion configured to insert into the ground.

3. The bracket of claim 2, wherein:
the stopping member comprises a fixing portion and a plurality of the protruding portions; and
the plurality of the protruding portions is located on opposite sides of the fixing portion.

4. The bracket of claim 1, wherein:
the sleeve further defines a guiding groove; and
the second mounting portion is movably passed through the guiding groove.

5. The bracket of claim 1, wherein:
the main body comprises a connecting member, a first extending member, a second extending member, and a third extending member;
the first extending member is connected to a middle portion of the connecting member;
the second extending member and the third extending member are respectively connected to two ends of the connecting member; and
the support member is coupled to the first extending member.

6. A warning structure comprising a bracket and a warning member mounted on the bracket, the bracket comprising:
a main body;
a plurality of rollers rotationally mounted to the main body; and
a stopping assembly comprising a support member, a mounting member, and a resilient member; wherein:
the support member is coupled to the main body;
the mounting member is movably mounted to the support member;
the plurality of rollers is mounted to the mounting member and the main body;
the resilient member elastically resists the support member and the mounting member to bias the mounting member; and
when the support member is subjected to a downward force, the support member abuts against a ground to keep the bracket stationary;
the stopping assembly further comprises a sleeve;
the sleeve is fixed in the support member;
the sleeve defines a receiving cavity;
the mounting member comprises a first mounting portion and a second mounting portion;
the first mounting portion is movably disposed in the receiving cavity;
a corresponding one of the plurality of rollers is rotationally sleeved on the second mounting portion; and
the resilient member is mounted in the receiving cavity and contacts the first mounting portion.

7. The warning structure of claim 6, wherein:
the stopping assembly further comprises a stopping member mounted on a bottom end of the support member;
the stopping member comprises at least one protruding portion configured to insert into the ground.

8. The warning structure of claim 7, wherein:
the stopping member comprises a fixing portion and a plurality of the protruding portions; and
the plurality of the protruding portions is located on opposite sides of the fixing portion.

9. The warning structure of claim 6, wherein:
the sleeve further defines a guiding groove; and
the second mounting portion is movably passed through the guiding groove.

10. The warning structure of claim 6, wherein:
the main body comprises a connecting member, a first extending member, a second extending member, and a third extending member;
the first extending member is connected to a middle portion of the connecting member;
the second extending member and the third extending member are respectively connected to two ends of the connecting member; and the support member is coupled to the first extending member.

\* \* \* \* \*